Dec. 11, 1962 C. L. ROTHROCK Re. 25,296

APPARATUS AND METHOD FOR THE JOGGING AND JOINTING OF VENEER

Original Filed Oct. 9, 1958 7 Sheets-Sheet 1

INVENTOR.
CLARENCE L. ROTHROCK
BY Naylor & Neal
ATTORNEYS

APPARATUS AND METHOD FOR THE JOGGING AND JOINTING OF VENEER

Original Filed Oct. 9, 1958 7 Sheets-Sheet 2

INVENTOR.
CLARENCE L. ROTHROCK
BY
Naylor & Neal
ATTORNEYS

APPARATUS AND METHOD FOR THE JOGGING AND JOINTING OF VENEER

Original Filed Oct. 9, 1958 7 Sheets-Sheet 3

INVENTOR.
CLARENCE L. ROTHROCK
BY Naylor & Neal
ATTORNEYS

APPARATUS AND METHOD FOR THE JOGGING AND JOINTING OF VENEER

Original Filed Oct. 9, 1958 7 Sheets-Sheet 4

INVENTOR.
CLARENCE L. ROTHROCK

BY Naylor & Neal

ATTORNEYS

APPARATUS AND METHOD FOR THE JOGGING AND JOINTING OF VENEER

Original Filed Oct. 9, 1958 7 Sheets-Sheet 5

INVENTOR.
CLARENCE L. ROTHROCK
BY Naylor & Neal
ATTORNEYS

APPARATUS AND METHOD FOR THE JOGGING AND JOINTING OF VENEER
Original Filed Oct. 9, 1958 7 Sheets-Sheet 6
FIG_11
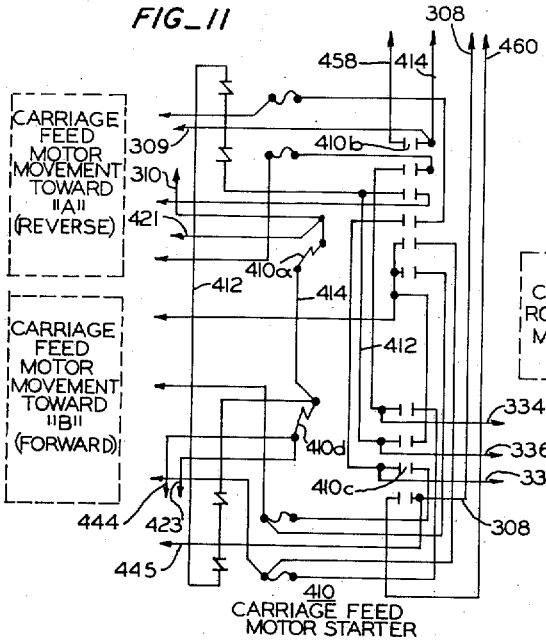
FIG_12
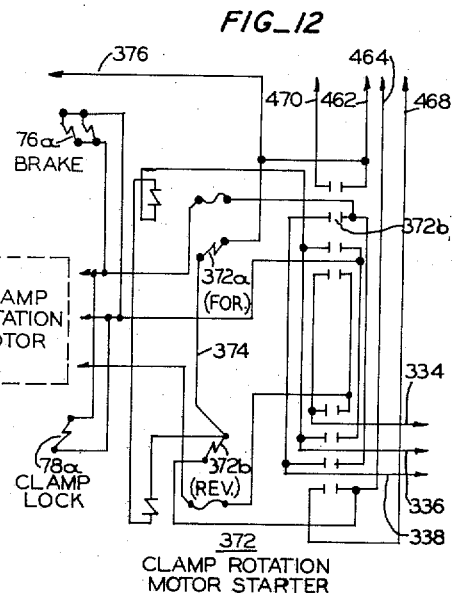
FIG_13
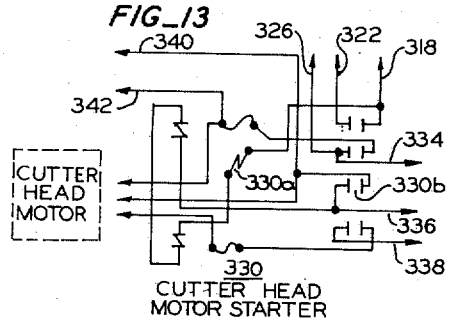
FIG_14
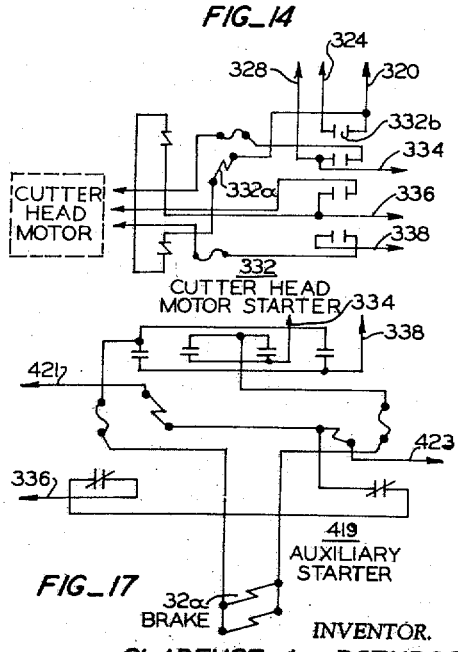
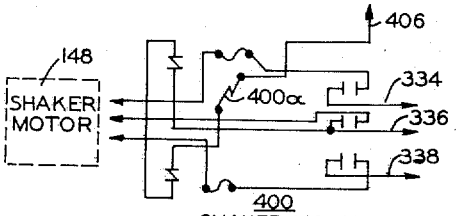
FIG_15
FIG_17
INVENTOR.
CLARENCE L. ROTHROCK
BY Naylor & Neal
ATTORNEYS

APPARATUS AND METHOD FOR THE JOGGING AND JOINTING OF VENEER

Original Filed Oct. 9, 1958 7 Sheets-Sheet 7

INVENTOR.
CLARENCE L. ROTHROCK
BY Naylor & Neal
ATTORNEYS

United States Patent Office

Re. 25,296
Reissued Dec. 11, 1962

25,296

APPARATUS AND METHOD FOR THE JOGGING AND JOINTING OF VENEER

Clarence L. Rothrock, Oroville, Calif., assignor of one-half to Cloverdale Plywood Co., Cloverdale, Calif., a corporation of California Original No. 3,000,410, dated Sept. 19, 1961, Ser. No. 766,284, Oct. 9, 1958. Application for reissue Nov. 30, 1961, Ser. No. 166,974
30 Claims. (Cl. 144—117)

Matter enclosed in heavy brackets [ ] appears in the original patent but forms no part of this reissue specification; matter printed in italics indicates the additions made by reissue.

This invention relates to veneer jointers, and more particularly to a veneer jointer of the type utilizing one or more travelling cutter heads adapted to make movable swipes past a stationary package of firmly clamped veneer laminae for the purpose of jointing the edges of such laminae, and to means for aligning and positioning the veneer laminae preparatory to such jointing.

It is an object of this invention to provide a veneer jointer of the character described, together with a method for the jointing of veneer, by means of which the jointing of veneer laminae is accomplished quicker than with the travelling head jointers at present generally in use through utilization of a rotary clamp for holding the veneer laminae, and shaker means and jump bar means for aligning and positioning the edges of the veneer laminae relative to the clamp for jointing by cutter means driven into cutting engagement with said laminae edges.

Another object of this invention is to provide a travelling head jointer of the character described capable of automatic or manual control and adapted for the handling of oversize sheets of veneer laminae.

Still another object is to provide a veneer jointer, operation of which requires a minimum of manual handling of the veneer laminae.

A further object is to provide a veneer jointer which achieves superior accuracy in the jointing operation and which is capable of effecting the jointing of opposite edges of veneer laminae without removal of same from the unit and which is further not limited to operation with veneer laminae but is capable of accurately jointing a wide range of cuttable sheet materials.

A still further object is to provide a veneer jointer easily adapted for accomplishing edge gluing in conjunction with the jointing of veneer laminae.

Other objects and advantages of this invention will become apparent from the following description, taken in conjunction with the drawings in which:

FIGURES 11 through 15 and FIGURE 17 are circuit diagrams of the standard motor starters utilized in a preferred means of control for the jointer of this invention.

The veneer jointer of this invention is adapted for use in the jointing of thin rectangular wood laminae making up the veneer or plies of plywood sheets and is particularly useful in conjunction with edge gluers and taping machines to which the jointed laminae are fed for veneer make-up after leaving the jointer. Broadly described, this invention includes rotatable clamping means having a pair of co-extensive jaws disposed with their clamping, or laminae engaging, faces parallel for the reception and retention therebetween of veneer laminae or other cuttable material. A feed table, shaker or jogger means and jump bar means are positioned adjacent the clamping means for respectively feeding, aligning and positioning the veneer laminae between the jaws of the clamping means for the subsequent jointing of the opposite edges of the laminae by cutter means, which latter are disposed to be driven into cutting engagement with the edges of the laminae while same are tightly held between the jaws of the clamping means. Ejection chains in the jaws serve to move the veneer laminae from between said jaws to the feed table after completion of the jointing operation and means are provided for both automatic and manual control of the jointer.

Figure 1:
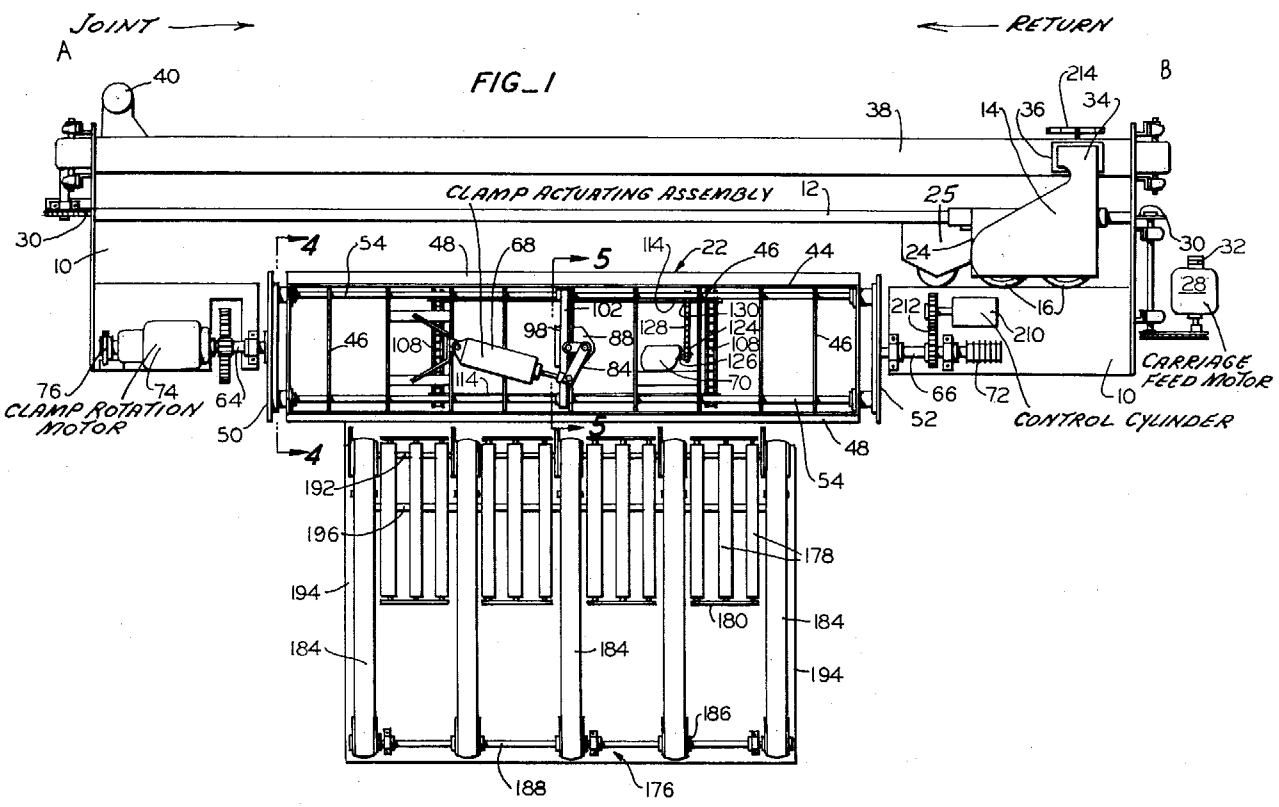
FIGURE 1 is a view in plan of the veneer jointer of this invention.
Figure 2:
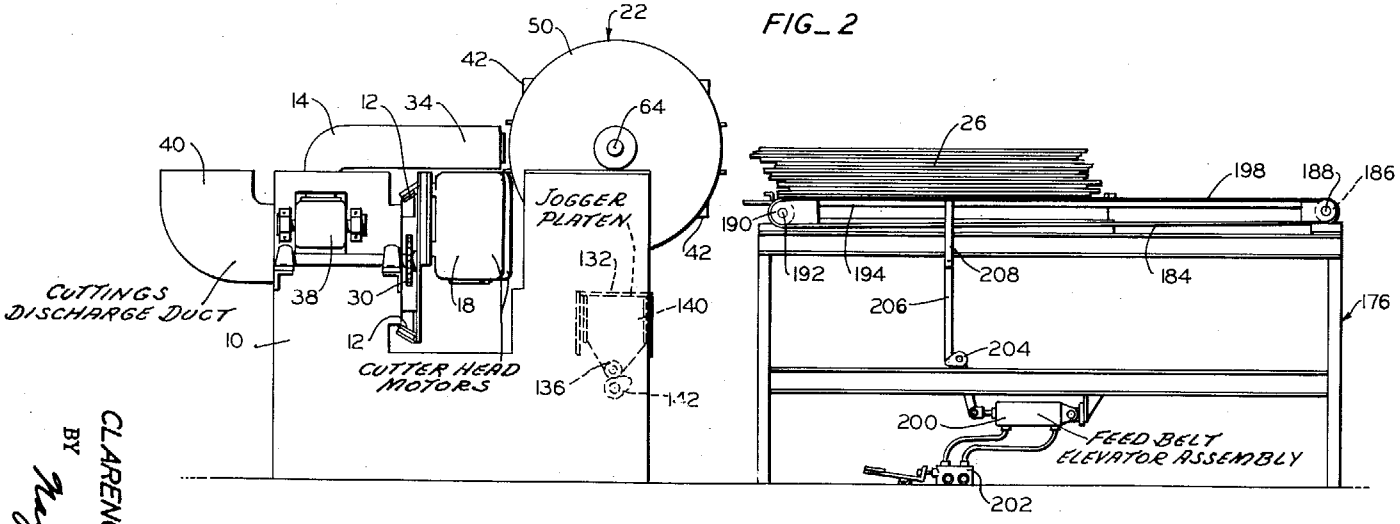
FIGURE 2 is a view in end elevation of the jointer with cooperating veneer laminae feed means positioned adjacent thereto.

Referring now to FIGURES 1 and 2, a structural framework 10 provides support for machined surface ways 12 upon which is disposed for to and fro movement a carriage 14 having two cutter heads 16 of conventional design driven by motors 18 and 20. The machined surface ways 12 are of sufficient length to provide parking room at the ends, respectively designated A and B, for carriage 14, to permit rotation of the clamp 22 located closely adjacent the carriage path of travel. There may be mounted upon carriage 14 at end 24 a conventional glue applicator 25 positioned to follow the cutter heads 16 applying glue to the veneer laminae 26 immediately after jointing. The carriage 14 is drawn back and forth on the ways 12 by carriage feed motor 28 linked to carriage 14 through chain 30. The carriage feed motor 28 is of a two speed type utilizing a solenoid brake 32 and driving through a reduction gear (not shown) to provide a satisfactory carriage speed. Where use of the glue applicator 25 is contemplated, it is preferable that the carriage motor operate at relatively high speed in order to provide for fast return of the cutter heads since, when used with such applicator, such heads are operable with movement of the carriage in one direction only. Provision is made for vacuum elimination of cuttings from the cutter heads 16 through duct 34 on carriage 14 connected through flange 36 to flexible belt 38, the cuttings being drawn off by vacuum at 40.

Figure 3:
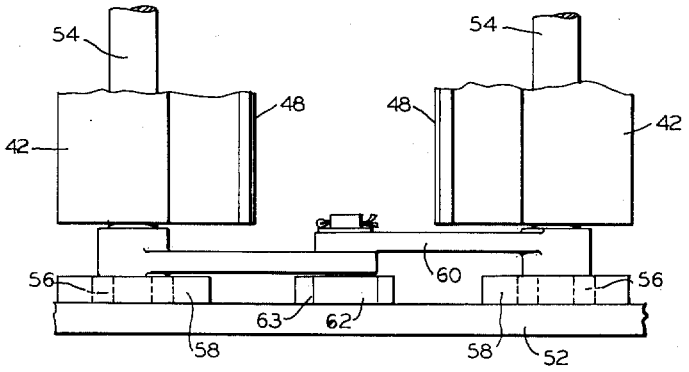
FIGURE 3 is a view in plan, partially broken away, of the toggle linkage utilized in the clamping means.
Figure 4:
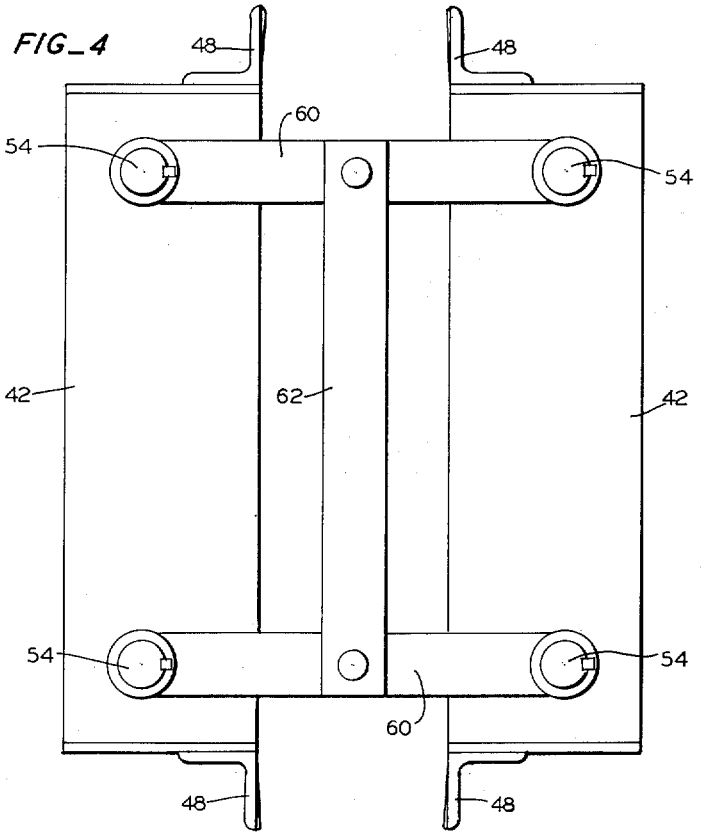
FIGURE 4 is a view in section of the clamp toggle linkage taken on the line 4—4 of FIGURE 1.
Figure 8:
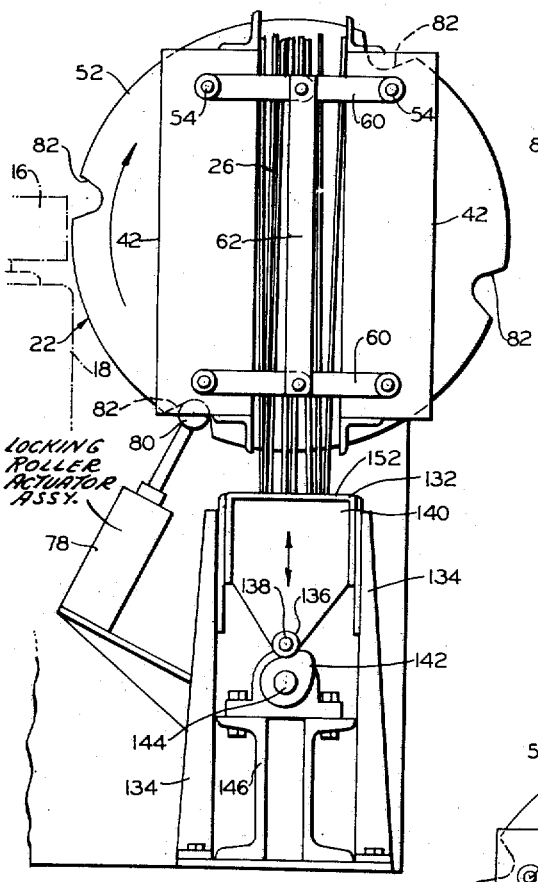
FIGURE 8 is a view in end elevation of a portion of the shaker and clamp assemblies with the clamp secured in a vertical position against rotation and with the clamp jaws in a relaxed or open position.

In FIGURES 1 and 8, the clamp 22 is shown comprised of a pair of co-extensive generally rectangular jaws 42, each made up of an open box frame 44 reinforced by cross members 46 with angular laminae engaging face members 48 secured at either side. The jaws 42 are carried in parallel relationship with the machined surface ways 12 between end support members or discs 50 and 52, being supported upon longitudinally disposed parallel rods 54, journaled for rotation in slide bars 56. The slide bars 56 move in guideways 58 (FIGURE 3) of the discs 50 and 52, thereby determining a fixed rectilinear path of travel for the jaws 42. Pairs of toggle links 60, disposed at either end of [paws] *jaws* 42, are respectively keyed to the ends of the rods 54 for rotation therewith and are connected intermediate the jaws 42 by strap links 62, the latter being guided in reciprocal translatory movement by guideways 63 of discs 50 and 52. The pairs of toggle links 60 and the connecting strap links 62 function to effect the opening and closing of the clamp jaws 42, while at the same time maintaining the jaws with their laminae engaging faces in parallel relationship as more fully described hereinafter. The jaws 42, of sufficient size and rigidity to handle veneer laminae of sizes normally contemplated for jointing, are disposed such that their outer edges, as defined by angular laminae engaging face members 48, are closely adjacent the path of travel of cutters 16 when the jaws 42 are in a horizontal or pointing position.

The discs 50 and 52 are carried in rotation upon central perpendicularly extending shafts 64 and 66, which are each hollow. Shaft 64 serves to convey air to a solenoid operated pneumatic valve (not shown) controlling the double acting clamp actuating pneumatic piston and cylinder assemblies 68, and shaft 66 provides a raceway for electrical wiring to said solenoid-operated pneumatic valve, ejection chain motors 70 located in either jaw of clamp 22, and various limit switches mounted upon said clamp. Rotation of the shaft 64 with respect to the air supply is permitted by a slip joint (not shown) connected with the shaft. Similarly, rotation of circuitry, i.e., circuit elements, carried by the lamp 22 is permitted through use of a number of insulated rings 72 secured to shaft 66 for rotation therewith. Mounted upon structural framework 10 and stationary relative to the rings 72 are spring-loaded carbon segments (not shown) respectively contacting appropriate rings to complete the necessary control and power circuitry indicated in FIGURE 16.

Figure 5:
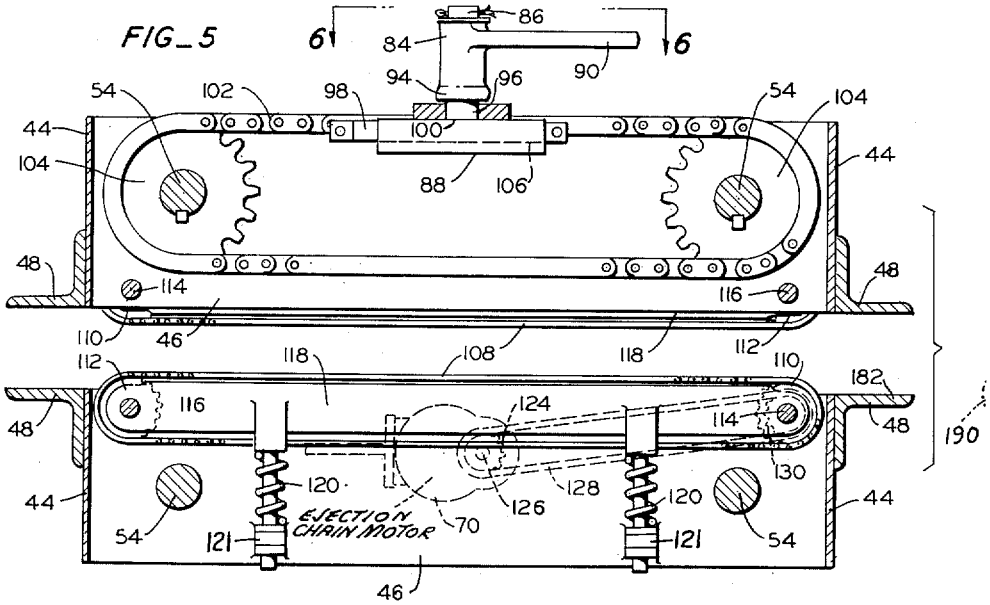
FIGURE 5 is a view in section taken on line 5—5 of FIGURE 1 showing a portion of the clamp crank and chain linkage utilized in clamp closure.
Figure 6:
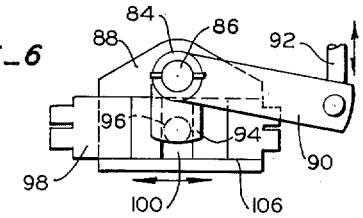
FIGURE 6 is a view taken on the line 6—6 of FIGURE 5.

A clamp rotation motor 74 is provided to drive the clamp in rotation through shaft 64 and suitable gear reduction, and a solenoid brake 76 serves to prevent the clamp rotation motor 74 from coasting upon power shutoff. In FIGURE 8 is shown pneumatic piston and cylinder assembly 78, which actuates locking roller 80, the latter being adapted to fit into four notches 82 diametrically disposed in mutually perpendicular pairs about the periphery of disc 52, for the purpose of locking the clamp 22 accurately in position for the shaking or the jointing operation. As previously indicated, accurate horizontal positioning of the clamp jaws 42 is extremely important because of the proximity of the path of travel of the cutters 16 to the adjacent edges of the clamp jaws 42 during the jointing operation. Further, proper alignment and positioning of the laminae 26 within the jaws 42 are dependent upon accurate vertical positioning of the jaws, as will become apparent from the description of the machine operation which follow:

Actuating means are provided in each jaw of the clamp for effecting opening and closing thereof and are typically illustrated in detail for the upper clamp jaw in FIGURES 5 and 6. The actuating means include crank and chain linkages which comprise a bell crank 84 disposed upon an upright shaft 86 journaled for rotation in member 88 secured to an associated jaw reinforcing cross member 46. The upper arm 90 of the bell crank 84 is pin connected to rod 92 of pneumatic piston and cylinder assembly 68 and the lower arm 94 is slidably connected through integral pin 96 to bar 98, pin 96 moving in the guideway 100 formed in bar 98. Bar 98 is interposed in endless chain 102 entrained about sprockets 104 keyed to shafts 54 which latter are journaled in the ends of the clamp frame 44. As the chain 102 is caused to move through operation of the piston and cylinder assembly 68, bell crank 84, and bar 98, the sprockets 104 and shafts 54 are driven in rotation to effect relative movement of the clamp jaws 42 through action of toggle links 60 and strap links 62. Sideways movement of the chain in the vicinity of the bell crank 84 is prevented by the bar 98 moving in guideway 106 of member 88.

Referring now to FIGURES 1 and 5, each jaw 42 of clamp 22 is provided with ejection means comprising a pair of spaced apart parallel endless chains 108 disposed transversely of the clamp jaws 42 and entrained about drive sprockets 110 and idler sprockets 112, respectively secured to shafts 114 and 116 journaled at either end in support members 118. As illustrated in FIGURE 5, the ejection chains in opposite jaws are individually urged toward one another to project beyond the laminae engaging faces of the jaws by compression springs 120 acting at one end upon support members 118 and at the other end upon projecting support members 121 secured to cross members 46. Shafts 114 and 116 and the chains 108 carried at either end thereof on sprockets 110 and 112, are driven in rotation by motor 70 through a sprocket 124 secured to motor output shaft 126 and a chain 128 entrained about sprocket 124 and sprocket 130 secured to the shaft 114.

Figure 7:
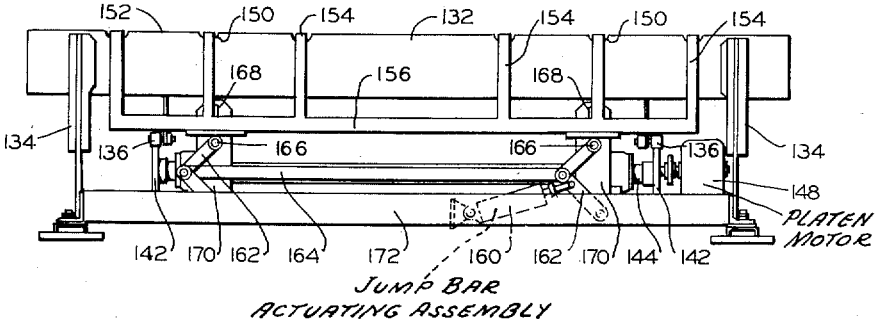
FIGURE 7 is a view in side elevation of the shaker or jogger means of this invention showing in dotted outline the jump bar actuating cylinder incorporated therein.
Figure 9:
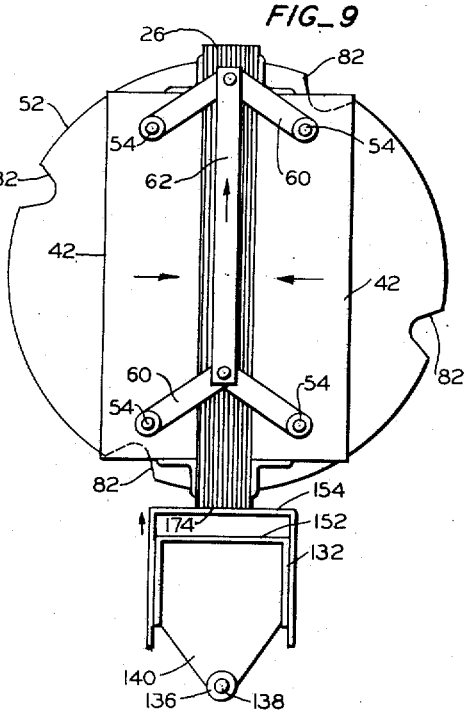
FIGURE 9 is a view similar to that of FIGURE 8 showing the clamp jaws closed and the jump bar of the shaker means elevated.

In FIGURES 7, 8 and 9 is illustrated the shaker or jogger means utilized for aligning the edges of the veneer laminae, which are comprised of a horizontally disposed channel member 132 mounted directly below the clamp 22 in alignment with the clamp axis of rotation to serve as a laminae edge aligning platen. Member 132 is adapted to reciprocate between upright guide members 134 being carried at either end upon rollers 136 secured to shafts 138 journaled in members 140, the latter depending from and being secured to either end of member 132. Rollers 136 serve as cam followers engaging the cams 142 secured at either end of shaft 144 carried in upright members 146 and imparting an up and down vibratory or jogging movement to platen member 132 as shaft 144 is driven in rotation by motor 148.

Figure 10:
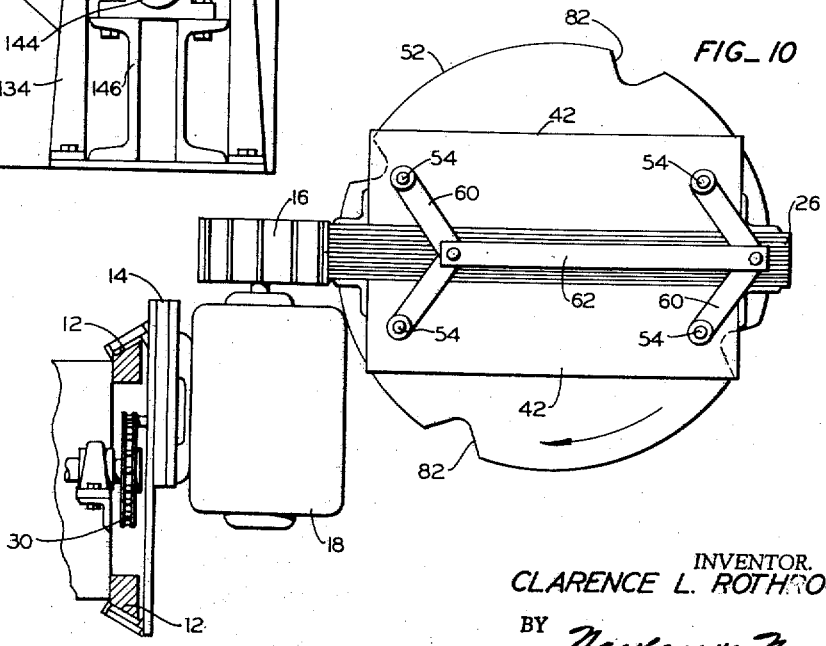
FIGURE 10 is a view in end elevation showing the cutter motor and a cutter head in position for the jointing operation and the veneer laminae horizontally clamped and positioned therefor.

Recesses 150 are provided at intervals in the upper surface 152 of platen member 132 for reception, in flush fitting relationship, of transverse bars 154. These bars are bent at right angles to extend down over both sides of the platen member 132 and are secured at their ends to horizontal tie bars 156. The bars 154 and 156 thus assembled are generally designated a jump bar assembly. Such assembly is held to the platen member 132 by resilient tension means (not shown) and can be raised from platen upper face 152 through the action of a jump bar pneumatic piston and cylinder assembly 160 controlled by solenoid operated pneumatic valve 158 (FIGURE 16) and acting through toggle links 162 and connecting strap link 164 positioned at one side of the platen member 132. Guidance for toggle links 162 is provided by pins 166 secured thereto and moving in slots 168 in upright members 170, the latter being secured to longitudinal support member 172. As illustrated in FIGURE 9, the jump bar assembly functions to raise the veneer laminae 26 into the jaws of the clamp 22 thereby properly positioning or orienting the lower edges 174 of the laminae 26 relative to the clamp jaws 42 for jointing. In orienting the laminae relative to jaws 42, the laminae are also effectively oriented relative to the path of travel of the cutters 16; and the depth of the uniform and equal cut to be made in each of the laminae during edge jointing is thereby accurately determined. Such elevation of the laminae with subsequent dropping of the jump bar assembly also prevents interference of the laminae with clamp rotation, necessary to move such laminae from the shaking position of FIGURE 9 to the jointing position of FIGURE 10.

In FIGURE 1 is shown the feed table 176 utilized both for loading into clamp 22 and unloading therefrom veneer laminae 26 and having positioned thereon at intervals a number of small feed rollers 178 mounted for rotation in sets of three in support members 180. The rollers 178 are positioned substantially perpendicular to the longitudinal axis of the clamp 22 in a horizontal plane with their upper surface slightly below the plane of the laminae engaging face 182 of the clamp lower jaw as that jaw is disposed when the clamp is in the horizontal open or relaxed position of FIGURE 5. In addition to the feed rollers 178, there are provided on the feed table 176 at either end thereof and at intervals between rollers 178, feed belts 184 disposed parallel to the rollers 178 and entrained about drive sheaves 186 secured to shaft 188 and idler sheaves 190 secured to shaft 192, shafts 188 and 192 being journaled in side members 194 rigidly interconnected by cross member 196 and pivotally secured at their rearward ends to shaft 188. The upper surfaces 198 of the belts 184 normally lie in retracted positions below the upper surfaces of the feed rollers 178. However, for the clamp loading operation the belts 184 may be pivoted to raise their clamp adjoining ends above the feed roller surfaces and above the face 182 of the adjacent horizontally positioned and open clamp lower jaw. Pivoting of the belts 184 is accomplished through the action of pneumatic piston and cylinder assembly 200 which is controlled by manually operated foot valve 202 and acts through bell cranks 204 and connecting links 206 secured to members 208 depending from each of the side members 194.

Figure 16:
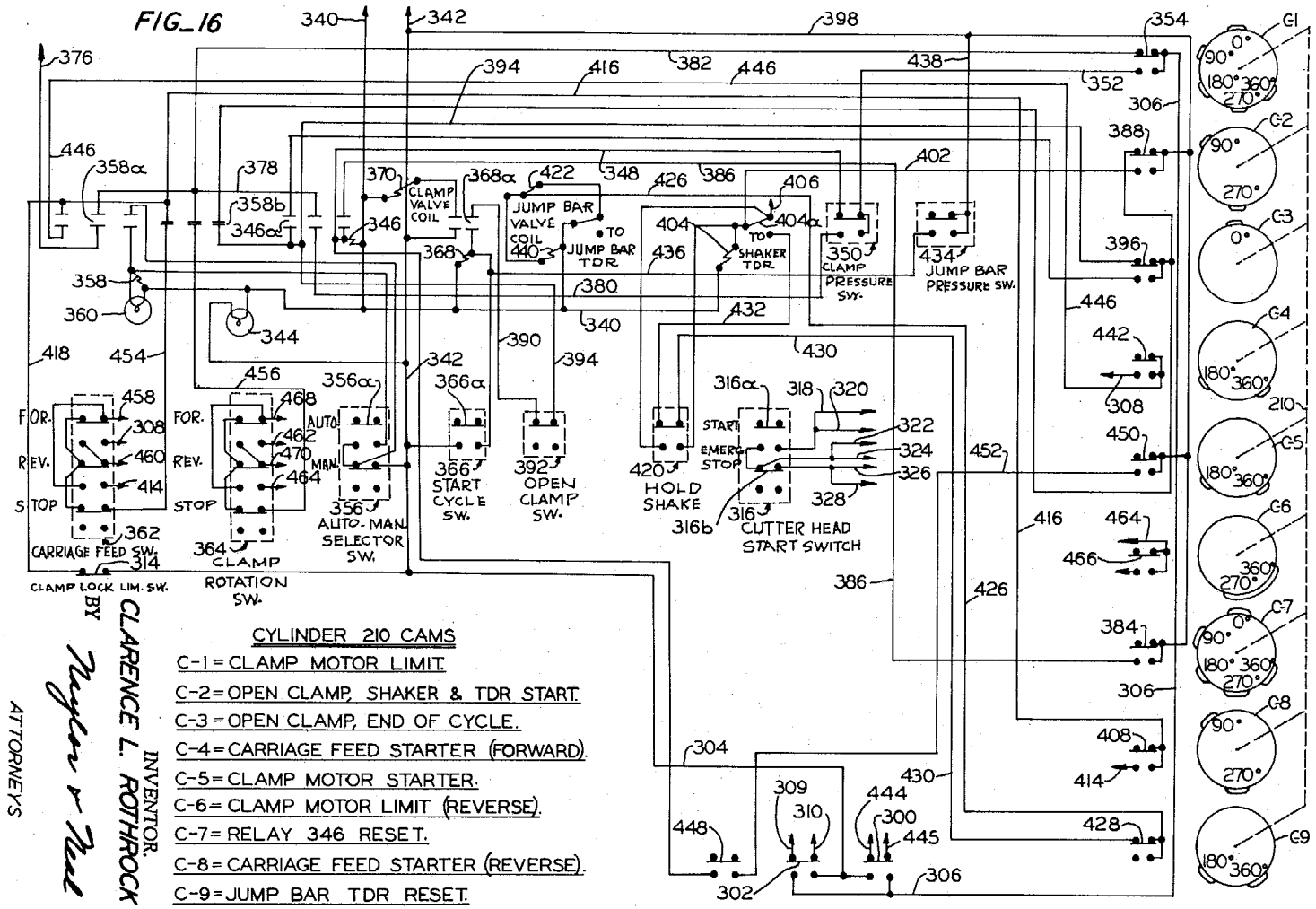
FIGURE 16 is a circuit diagram, partially in schematic form, of a preferred means for control of the jointer.

A rotatable control cylinder 210 is utilized in the automatic control of the jointing operation and is provided with a series of projections or camming surfaces circumferentially aligned in nine separate tracks to form the cams indicated in FIGURE 16. The cylinder 210 is driven in rotation by the rotating clamp 22 through reduction gearing 212 which is in the ratio of one and one-half to one, permitting the cylinder to turn one complete revolution while the clamp turns one and one-half revolutions.

For convenience, the individual camming surfaces or lobes of the various cams of control cylinder 210 are designated by the positions they bear relative to the rotation of the clamp 22, the reference, or zero position, representing the clamp horizontally disposed, as in FIGURE 5, with its jaws open for receipt of a package of veneer. Because of the gear reduction utilized in driving the cylinder 210 from the rotating clamp shaft 66, these cam surfaces represent one and one-half times the rotation to which the cylinder 210 has itself been subject. As shown in FIGURE 16, nine control switches are provided, each being mounted in a stationary position adjacent to the cylinder for actuation by an associated cam thereon as the cylinder revolves in response to the rotation of the clamp 22. The cylinder 210 thereby serves to control the machine operation, as described hereinafter, through the various switches and relays shown in FIGURE 16, and through conventional motor starters, circuitry for which are shown in FIGURES 11 through 15 and 17. The relays and switches as shown in these figures are in their normal positions unless otherwise noted. Those switches actuated by the cams of cylinder 210 are thus shown riding in the low portion of the cam clear of the camming surfaces.

For the purpose of describing operation of the machine and its control through the circuitry of FIGURES 11 through 17, the carriage 14 is initially assumed to be in its normal or parked position at "B" end of the machined surface ways 12 or to the right as viewed in FIGURE 1. The clamp 22 is positioned, as in FIGURE 5, with its jaws 42 locked by roller 80 in a substantially horizontal and open position, ready for the receipt of veneer laminae 26 from feed table 176. The control cylinder 210 is positioned with its zero degree camming surfaces uppermost as shown in FIGURE 16. However, as previously indicated, the switches asociated with cylinder 210 are shown in FIGURE 16 in their normal positions, free from engagement by the cams of the cylinder.

Limit switches 300 and 302 are provided at "B" end and "A" end of the ways, respectively, for actuation by member 214 secured to the side of exhaust duct 34. Accordingly, with the carriage 14 assumed to be at "B" end of the ways, limit switch 300 is actuated by member 214 to effect interconnection of conductors 304 and 306 and limit switch 302, in normal position, connection of conductors 309 and 310. The limit switches 300 and 302 serve to stop the carriage feed motor 28 when the carriage 14 reaches "A" end or "B" end of the ways and also serve to permit rotation of the clamp 22 only when the carriage 14 is positioned clear thereof at either end of the ways. With the clamp jaws 42 assumed to be locked in a horizontal position, the limit switch 314, which is actuated by movement of the roller 80 into a notch 82, is closed. It is the function of limit switch 314 to prevent carriage feed unless the clamp 22 is locked either in a vertical or horizontal position by the locking roller 80 extending into an adjacent notch 82 of the disc 52. As earlier indicated, this feature is particularly necessary when the jaws 42 of the clamp 22 move to a position closely approximating the horizontal due to the limited distance maintained between the edge of the jaws and the path of travel of the cutters 16 and the consequent danger of contact between the two if the jaws are not locked in a horizontal position. It is this limited spacing between the cutters 16 and the edges of the jaws, as defined by members 48, which assures that the veneer laminae 26 will be gripped in vise-like fashion in the immediate vicinity of the laminae edge margins for accurate jointing by the cutters.

Automatic operation of the jointer requires only one operator who stands at one side of the feed table 176 adjacent the machine controls feeding superposed veneer laminae 26 from adjacent feed means (not shown) onto the feed table 176 to a position atop feed belts 184, the feed rollers 178 aiding the operator in properly positioning the laminae. With shaft 66 utilized as a wiring raceway and cylinder 210 for automatic switch control, it has been found convenient to locate the control boxes (not shown) adjacent thereto at "B" end of the machine, the operator occupying a position to the right of the feed table as viewed in FIGURE 1.

With the veneer laminae 26 suitably positioned upon the feed table 176 in superposed or face to face relationship, the operator depresses the foot pedal control for valve 202 actuating piston and cylinder assembly 200 which elevates the ends of the belts 184 adjacent the clamp 22 by causing the shaft carrying members 194 to pivot upwardly through the action of members 204, 206 and 208. As the belts 184 assume an elevated position, a switch (not shown) is actuated to energize a feed motor (not shown) which drives the feed belts 184 in rotation to insert the veneer laminae 26 between the jaws 42 of the clamp 22.

A push button of the cutter head start switch 316 is thereupon manually depressed moving normally open contact 316a to a closed position effecting the connection of parallel conductors 318 and 320 to parallel conductors 322 and 324, and to parallel conductors 326 and 328. The coils 330a and 332a of the cutter head motor starters 330 and 332 are thereby energized through connection with voltage supply conductors 334 and 336 to effect closure of the normally open starter contacts 330b and 332b. Closure of starter contacts 330b and 332b effects connection of supply conductors 334, 336 and 338 carrying three phase 440 volt A.C. power with the respective leads of the cutter head motors 18 and 20 energizing the same. In addition, closure of the contacts 330b, causes a voltage to appear on conductors 340 and 342, which are respectively connected to supply conductors 336 and 334. The conductors 340 and 342 carry single phase 440 volt A.C. power and serve as the sole power source for the control system. Emergency stoppage of the machine may therefore be effected through disconnection of conductors 340 and 342 from the supply conductors 336 and 334 which is provided for through an emergency stop button in the cutter head start switch, depression of which causes normally closed contact 316b to open, breaking the energizing circuit for the cutter head motor starter coils 330a and 332a and opening contacts 330b and 332b. Although three phase 440 volt A.C. power is indicated above, two phase 220 volt or single phase 110 volt power would be satisfactory with suitably rated electrical system components.

With depression of the start button of switch 316 and the appearance of a voltage in conductors 340 and 342, the manual light 344 is on, indicating that the machine is in condition for manual operation. The coil of relay 346 is energized to effect closure of contacts 346a by connection across the conductors 340 and 342 through a circuit comprised of conductor 348, normally positioned clamp pressure switch 350, conductor 352, switch 354 in cam-actuated 0° position, conductor 306, switch 300 and conductor 304.

Although operation may be controlled both manually and automatically, the following description will cover only automatic operation of the jointer, with elaboration being given later to manual control. When operated under automatic control, the sequence of operations of the machine elaborated upon hereinafter, includes the steps of closing the clamp jaws 42 tightly upon superposed veneer laminae 26 fed thereto, rotating the laminae 90° from a horizontal to a substantially vertical or upright position, releasing the clamp jaws to permit downward gravitation of the laminae 26 onto platen member 132 below, moving the platen member up and down rapidly to impart a vibratory movement to the laminae carried thereon effecting alignment of the lower edges of such laminae, raising the jump bars 154 from their retracted positions in the platen member 132 to elevate the edge aligned laminae to jointing positions relative to the clamp jaws, closing the clamp jaws tightly upon the thus positioned laminae, rotating the clamped laminae another 90° to a horizontal position and thereupon driving the cutters 16 into cutting engagement with the aligned and positioned edges of the laminae to effect the jointing thereof. Jointing of the opposite edges of the laminae is accomplished in a similar fashion with laminae ejection being effected through ejector chains 108, after completion of the jointing operation and after a further rotation of the clamp jaws 180°. The latter step of rotating the veneer laminae another 180° before ejection, is one of convenience for speeding the ejection of the laminae to the feed table 176, as hereinafter explained, and may be dispensed with if desired.

Automatic control is manually selected by depression of an "auto" button of the auto-manual selector switch 356 which places the machine in condition for automatic operation by moving contact 356a from its normally open position to a closed position effecting energization of the coil of relay 358 by connecting such coil across the conductors 340 and 342. The normally open contacts 358a of relay 358 are thereby caused to close and the normally closed contacts 358b are caused to open. The automatic light 360, in parallel with the coil of relay 358, is lighted. Carriage feed switch 362 and the clamp rotation switch 364, each utilized only for manual operation of the jointer, are disconnected from the control system with the opening of the normally closed contacts 358b of the relay 358.

With the machine ready for automatic operation, automatic cycling is begun by depression of the button of the start cycle switch 366 which moves the normally open contact 366a to a closed position, energizing the coil of relay 368 by effecting its connection across conductors 340 and 342. The normally open contacts 368a of relay 368 are thereby caused to close, with the clamp valve coil 370 be energized by connection across lines 340 and 342 through associated closed relay contact 368a. The clamp valve (not shown) effects closure of the clamp jaws 42 upon the veneer laminae 26 positioned therebetween through actuation of the piston and cylinder assemblies 68 in each jaw, typically illustrated in FIGURES 1, 5 and 6. The resulting extension of rod 92 in the upper jaw, effects a clockwise rotation of bell crank 84 (FIGURE 6) through upper arm 90 and counterclockwise rotation of chain 102, sprockets 104 and shafts 54 (FIGURE 5) through lower arm 94 and integral pin 96 traveling in guideway 100 of bar 98, the latter moving transversely of the jaw in guideway 106 of member 88. Cooperative action of the piston and cylinder assembly 68 in the lower jaw similarly effects rotation of shafts 54 therein, but in a clockwise direction. Rotation of shafts 54 in the two jaws effects rotation of the toggle links 60 keyed thereto, which cooperate through strap links 62 in drawing the clamp jaws 42 together to cause the laminae engaging faces of such jaws to tightly abut the package of laminae positioned therebetween. The jaws 42 are guided in rectilinear movement by bars 56 and strap links 62 moving in guideways 58 and 63 in discs 50 and 52. As the jaws 42 close upon the veneer laminae 26, the ejection chains 108 and the assemblies associated therewith are caused to retract into the respective jaws against the bias of springs 120.

Upon development of sufficient clamping pressure, the clamp rotation brake coils 76a and the clamp rotation lock coil 78a are energized to effect release of the brake 76 and the locking roller 80 from their clamp restraining positions as the clamp rotation motor 74 is simultaneously energized to effect clamp rotation. The brake 76, like brake 32 utilized in conjunction with the carriage feed motor 28, is of a conventional type being solenoid actuated for release with energization of the motor and biased to effect braking of the motor against coasting upon motor and solenoid de-energization. Energization of motor 74 is accomplished through the clamp pressure sensitive switch 350, which is caused to reverse its normal position, thereby effecting energization of the starter coil 372a and closure of the contacts 372b of the forward side of the clamp rotation motor starter 372 by connection of the coil across conductors 336 and 342 through a circuit including conductors 374 and 376, relay 358, conductor 378, relay 346, conductor 380, clamp pressure sensitive switch 350, conductor 352, switch 354, conductor 306, switch 300, and conductor 304. With energization, the clamp rotation motor 74 effects rotation of the clamp 90° to a position with its jaws vertically disposed, clamp rotation being limited as hereinafter explained to 90°.

The control cylinder 210, geared to shaft 66, rotates with the clamp 22 causing the zero degree camming surface of cam C1 to move from under switch 354 thereby causing the movable contact of switch 354 to revert to its normal position. Energization of the clamp rotation motor starter 372 is nevertheless maintained through the normally positioned movable contact of switch 354, by-passing clamp pressure switch 350 and relay 346, the new starter coil energizing circuit including conductor 382. The coil of relay 346 is de-energized slightly before the clamp reaches a vertical position through the action of the 90° camming surface of cam C7 in opening switch 384. It may be noted that with original closure of relay 346, its coil was energized through a second circuit in parallel with the initial energizing circuit, the second circuit extending through the closed contact 346a of the relay itself, conductor 386 and closed switch 384. A change in the position of the cam-actuated switch 354, therefore, does not effect de-energization of the relay coil 346.

With the coil 372a of clamp rotation motor starter 372 energized through a circuit by-passing relay 346 and extending through cam-actuated switch 354 and relay 358, switch 354 serves as a limit switch for stopping the clamp motor through de-energization of the starter coil 372a. Thus, as the clamp rotates to the 90° position with its jaws vertically disposed, the 90° camming surface of cam C1 engages the movable contact of switch 354, breaking the energizing circuit for the coil 372a and stopping the clamp rotation motor.

With rotation of clamp 22 to the 90° position, cam C2 through its 90° camming surface effects the reversal of switch 388 causing the opening of contacts 368a through de-energization of the coil of relay 368 maintained, after initial energization, through a circuit including its own closed contact 368a, conductor 390, open clamp switch 392, conductor 394, normally positioned cam-actuated switch 396, switch 388, and conductor 398. Opening of relay contacts 368a causes the de-energizing of clamp valve coil 370 and the retraction of the rods 92 in each jaw, with the clamp jaws 42 thereby caused to open to the relaxed or open position of FIGURE 8, reversing the operation previously described for clamp jaw closure. The veneer laminae 26 thereupon drop downward until the lower edges of a substantial portion thereof rest upon the upper face 152 of the platen member 132, the remaining portion of the laminae 26 assuming such position after the shaking operation, a description of which follows.

Upon relaxation of the jaws, the clamp pressure switch 350 assumes its normal position and the contacts 346a are caused to close through energization of the coil of relay 346 through the above-described original energizing circuit including switches 350 and 354. Relay 346 is thus positioned to furnish an energizing circuit for the clamp rotation motor starter when the clamp jaws 42 are caused to close and an actuating pressure is exerted upon clamp pressure switch 350, i.e. after completion of the laminae aligning and positioning or orienting operations by the shaker and jump bar assemblies, as described hereinafter.

Cam actuated switch 388, in addition to effecting de-energization of the coil of relay 368, at the same time serves to energize coil 400a of shaker starter 400, closing contacts 400b and energizing the shaker motor 148 through a circuit including conductor 402, shaker time delay relay 404 and conductor 406. Shaker motor 148 drives shaft 144 and the cams 142 secured thereto in rapid rotation, effecting an up-and-down shaking movement of platen member 132 as the rollers 136 secured thereto engage the cam surfaces. Any of the laminae 26 not properly aligned with their lower edges resting upon the surface 152 of the platen member 132, are thereby caused to align themselves with the oscillation of the platen member.

At the same time as the shaker motor starter 400 effects operation of the shaker motor 148, the switch 408, actuated by the 90° camming surface of cam C8, effects energization of coil 410a and the closure of contacts 410b of carriage feed motor starter 410, coil 410a being connected across lines 336 and 342, through a circuit comprising conductors 412 and 310, limit switch 302, conductors 309 and 414, cam-actuated switch 408, conductors 416 and 418, and clamp lock limit switch 314. With closure of starter contacts 410b, the coils 32a of solenoid brake 32 are energized to effect brake release and the carriage feed motor 28 is caused to drive the carriage 14 from its parked position at "B" end of the ways 12 toward "A" end, limit switch 302 and brake 32 serving to stop the carriage when it reaches "A" end of the ways.

An auxiliary starter 419 (FIGURE 17), connected to starter 410 through conductors 421 and 423, is provided for effecting energization of brake coils 32a in order to isolate said coils form the circuitry of the carriage feed motor 28 and prevent brake drag which might otherwise occur were the brake coils 32a simply connected across two of the leads of such motor. For it is to be noted that different voltages appear across such leads as a result of providing motor 28 with a double field winding (not shown) to speed machine cycling by driving carriage 14 at a higher speed in the reverse direction toward "A" end of the ways than in the forward direction toward "B" end of the ways, in which latter movement, jointing of the veneer is accomplished.

While the carriage 14 moves toward "A" end of the ways, the shaker time delay relay 404 times out, deenergizing shaker motor starter coil 400a and stopping shaker motor 148. Should it be desired, the shake or jogging period may be prolonged by depression of a button on the hold shake switch 420 prior to the timing out of the shaker time delay relay 404. With the timing out of the time delay relay 404, movable contact 404a effects energization of jump bar valve coil 422 by effecting its connection across conductors 340 and 342 through a circuit including jump bar time delay relay 424 with its movable contact 424a in normal closed position, conductor 426, closed cam-actuated switch 428, conductor 430, hold shake switch 420, conductor 432, shaker time delay relay 404, conductor 402, switch 388 (in cam-actuated position) and conductor 398.

Upon the energizing of the jump bar valve coil 422, the jump bar piston and cylinder assembly 160 is actuated to elevate the jump bar assembly through toggle links 162 and strap link 164, pins 166 secured to the toggle links moving in slots 168 of members 170 to provide guidance for such links. Bars 154, elevated from their retracted positions in recesses 150 in platen member 132, engage the lower edges of the aligned veneer laminae 26 to uniformly raise the laminae to suitable positions between the clamp jaws preparatory to reclosure of the clamp jaws thereon and rotation of the laminate into horizontal positions for jointing. The laminae, thus positioned and oriented relative to clamp jaws 42 and to the path of travel of cutters 16, extend downward a uniform distance beyond the lower edges of the clamp jaws, assuring engagement and jointing of each of the laminae by the cutters 16 and a uniform and equal depth of cut of each of the laminae. As previously indicated, elevation of the laminae 26 by the jump bar assembly further provides clearance between the aligned and positioned laminae lower edges 174 and the platen member 132 permitting rotation of the clamp 22 into jointing position.

The jump bar pressure switch 434, caused to close with exertion of sufficient pressure upon jump bar piston and cylinder assembly 160, effects energization of the coil of relay 368 and closure of contacts 368a, the coil energizing circuit including conductor 436, closed jump bar pressure switch 434 and conductor 438. Energization of clamp valve coil 370 and closure of the clamp jaws 42 through action of piston and cylinder assemblies 68 is thereupon effected through closure of associated relay contact 368a. The jump bar time delay relay 440 thereupon times out, deenergizing the jump bar valve coil 422 and dropping the jump bar assembly to its normal retracted position with the bars 154 disposed within the recesses 150 of platen member 132.

With closure, the clamp 22 is caused to rotate 90° to the jointing position with the clamp pressure switch 350 effecting closure of the contacts 372b of the forward side of the clamp rotation motor starter 372 by energizing starter coil 372a, and accordingly clamp rotation motor 74, brake coils 76a and clamp lock coil 78a through the previously described energizing circuit therefor, with the exception that switch 302, actuated by member 214 to reverse its normal position with travel of the carriage 14 to "A" end of the ways, replaces switch 300 in the energizing circuit, switch 300 having returned to its normal position with movement of the carriage from "B" end of the ways. Clamp rotation is stopped at the 180° or jointing position, as described above, through the action of cam-actuated switch 354 in de-energizing starter coil 372a, setting the solenoid brake 76, and actuating the locking roller 80 to extend into an adjacent notch 82 of the disc 52 locking the clamp jaws 42 accurately and the veneer laminae 26 positioned therebetween in horizontal position for the jointing operation. The carriage feed motor 28 thereupon drives the carriage 14 toward "B" end of the ways causing the cutters 16 carried thereby to cuttingly engage and joint the adjacent accurately aligned and positioned edges of the veneer laminae 26, held firmly between the clamp jaws 42. In this connection, it should be noted that the angle members 48 assure firm gripping of the laminae margins in the immediate vicinity of cutter engagement.

Stoppage of the carriage 14 at "B" end of the ways is effected through the action of limit switch 300. Energizing of the carriage feed motor 28 to drive the carriage in the above jointing pass is accomplished as follows. Cam C4 through its 180° camming surface actuates switch 442, effecting closure of contacts 410c of carriage feed motor starter 410 and energization of carriage feed motor 28 by energizing the coil 410d through effecting its connection across conductors 336 and 342, the circuit including conductors 312 and 444, limit switch 300, conductors 445 and 308, cam actuated switch 442, conductor 446, a closed contact 358a of relay 358, conductor 418 and clamp lock limit switch 314. The coils 32a of solenoid brake 32 are energized simultaneously with the energization of the motor 28 to effect brake release.

Where edge gluing be desired, it may conveniently be accomplished during the jointing pass by utilizing conventional gluer 25 carried upon the carriage 14 to apply glue to the adjacent edges of the veneer laminate 26 immediately after jointing.

When the carriage 14 reaches "B" end of the ways 12, the clamp 22 must rotate to the 270° position without the opening and closing of its jaws 42, which therefore requires that an alternate circuit, not including clamp pressure switch 350, be provided for energizing relay 346 and the clamp rotation motor starter 372 series connected therewith. This is accomplished through switch 448, actuated by the carriage 14 when at "B" end of the ways; switch 450, actuated by the 180° camming surface of cam C5; and conductors 452 and 398.

From this point, the process described above is repeated, with the clamp rotating another 90° to the 270° position, opening to permit alignment and positioning or orienting of the veneer laminae 26 by the shaker and jump bar assemblies, and rotating another 90° for the jointing of the opposite edges of the veneer laminae. After completion of the second, or final, jointing operation, it has been found convenient to rotate the clamp another 180° in the same direction to speed the ejection of the veneer laminae from the clamp jaws 42, since the laminae 26, immediately after final jointing, are positioned at the side of the jaws opposite the feed table 176. The additional 180° clamp rotation is optional, its desirability being in large part determined by the relative speeds of laminae ejection effected by such clamp rotation in conjunction with use of the ejector chains, and the ejection speeds otherwise attainable by reliance upon the ejection chains only. Opening of the clamp jaws 42, in the manner previously described, through the operation of piston and cylinder assemblies 68 for ejection of the veneer laminae 26, is effected by switch 396 actuated by the zero degree camming surface of cam C3 to deenergize the coil of relay 368 and the coil of clamp valve 370.

With opening of the clamp jaws 42, the ejection chains 108, biased by springs 120, move inwardly to project from the faces of the jaws, as illustrated in FIGURE 5, to abuttingly engage the veneer laminae exerting a pressure thereon. Ejection chain rotation is effected through a manually operated push button start-stop switch (not shown) which controls energization of the ejector chain driving motor 70. A switch (not shown) at the end of clamp shaft 66 selects and permits operation of that pair of ejector chains only, which is located in the lower jaw, this being necessary to permit ejection of the veneer laminae 26 at the same side, i.e., in the direction of the feed table 176, whichever clamp jaw 42 is positioned lowermost, and to avoid conflicting rotation of the ejector chains 108 in one jaw with respect to those in the other. The ejector chains in the uppermost jaw serve to aid the driven ejector chains therebelow in gripping and guiding the veneer laminae from the jaws onto the feed table 176. After ejection to the feed table, the veneer laminae are manually moved by the machine operator through the aid of feed table rollers 178 to other machines or edge gluing, taping or other appropriate operations. The jointer is now ready for the start of another cycle.

The machine of this invention is intended primarily for automatic operation, as described above. However, provision is made for manual operation where it is required that the machine handle veneer laminae of greater width than the maximum width of the clamp jaws 42. Much of the circuitry utilized in manual operation is the same as that described above in connection with automatic operation and accordingly, a brief description of manual operation will suffice.

Initiation of manual operation after insertion of the veneer laminae 26 between the open horizontally positioned clamp jaws 42 is similar to initiation of automatic operation, i.e., the push button of the cutter head start switch 316 is depressed to start the cutter head motors 18 and 20 and cause a voltage to appear in conductors 340 and 342, manual indicator light 344 is on and the normally open contacts 346a of relay 346 are closed. At this point the start cycle switch 366 is actuated to effect closure of the clamp jaws 42 upon the veneer laminae 26. The carriage feed switch 362 and the clamp rotation switch 364 remain on the line, being respectively connected to conductors 416 and 382 through conductors 454 and 456 and normally positioned contacts 358b of relay 358. Carriage feed switch 362 is connected to the carriage feed motor starter 410 through conductor 308, serving to energize the coil 410d for forward movement of the carriage toward "B" end of the ways, and through conductor 414, to coil 410a for reverse movement of the carriage toward "A" end of the ways. Conductors 458 and 460, respectively, provide holding circuits for coils 410a and 410d. Clamp rotation switch 364 is connected through conductor 462 to coil 372a of clamp rotation motor starter 372 for effecting normal, or forward, rotation of the clamp 22 and through conductor 464, to starter coil 372b for effecting reverse rotation of the clamp 22, the latter rotation beig permitted between the 270° and 360° positions by the switch 466 actuated by the extended camming surface of cam C6. Conductors 468 and 470 respectively provide holding circuits for coils 372b and 372a.

In jointing of oversize veneer laminae it is necessary that the laminae be removed from the clamp after jointing of one edge and manually turned over for alignment, positioning and jointing of the opposite edge. In operating the machine manually such safety devices as the clamp lock limit switch 314 and the limit switches 300 and 302 perform their usual functions in coordinating the movement of the carriage 14 with the rotation of the clamp 22 as do the coils, time delay relays, and pressure switches associated with the clamp, shaker and jump bar assemblies. Also, the various cams perform their usual functions insofar as is compatible with the manual control functions of switches 362 and 364, series inserted in the carriage feed motor starter and clamp rotation motor starter circuits.

It may be seen that the basic features of positive, safe and effective control, characteristic of the automatic jointing operation, are retained in the manual operation of the jointer, which latter offers the added feature of adaptability to oversize veneer laminae.

What is claimed is:

1. A machine for the jogging and jointing of veneer laminae comprising, in combination, clamping means for clamping veneer laminae together in face to face relationship for jointing, means for driving the clamping means in rotation, shaker means disposed beneath the clamping means for effecting edge alignment of the veneer laminae by imparting vibration thereto when said laminae are rotated into edge down position and released by the clamping means to gravitate downward into engagement with the shaker means, jump bar means disposed beneath the clamping means for thereafter positioning the edge aligned veneer laminae relative to the clamping means for reclamping thereby in fixed position preparatory to jointing, cutter means disposed for movement immediately adjacent a side of said clamping means for jointing the edge aligned and positioned veneer laminae after rotation thereof by the clamping means out of said edge down position and while said laminae are clamped together in said fixed position by the clamping means, and means for driving the cutter means into cutting engagement with the edges of the veneer laminae for effecting the fixedly positioned jointing thereof.

2. The combination of claim 1, wherein the clamping means includes a pair of rotatable support members between which are carried for unit rotation a pair of jaws having planar faces for engaging the laminae, said jaws being adapted for movement between a closed or laminae clamping position and a relaxed or open position and being maintained with their veneer laminae engaging faces at all times substantially parallel through pairs of coacting toggle links disposed to straddle the ends of the jaws.

3. The combination of claim 2, wherein opening and closing of the jaws is accomplished by driving the pairs of co-acting toggle links in synchronous rotation through rods tied to the links and disposed within and extending longitudinally of the jaws.

4. The combination of claim 1, wherein vibration is imparted to the veneer laminae by the shaker means through a platen member adapted to be driven in up-and-down movement, said platen member having in its laminae engaging upper face a plurality of recesses, and wherein positioning of the laminae by the jump bar means is effected through a plurality of members adapted for elevation from retracted positions within said recesses to engage and support said laminae upon their aligned edges.

5. A machine for the [jagging] *jogging* and jointing of veneer laminae comprising, in combination, clamping means including a pair of cooperating jaws adapted for movement relative to each other and relative to rotatable end support means provided therefor, said jaws moving between an open position and a closed position for clamping tightly together in face to face relationship veneer laminae positioned therebetween, means for driving the clamping means in unit rotation, shaker means positioned below said jaws for aligning the edges of the veneer laminae when said laminae are positioned edge down by the clamping means and released therefrom to engage the shaker means, jump bar means interposed between the shaker means and the jaws of the clamping means movable independently and transversely of the latter for orienting the laminae relative to said jaws preliminary to jointing of the laminae, cutter means disposed for to and fro movement adjacent said jaws for jointing the edges of the veneer laminae while the latter are tightly clamped between said jaws after aligning and orienting by the shaker means and the jump bar means, and means for driving the cutter means in said movement past the clamping means and into cutting engagement with the thus aligned and oriented edges of said clamped veneer laminae.

6. The combination of claim 5, wherein feed means are positioned adjacent the jaws of the clamping means for feeding the veneer laminae thereto, and ejection means are disposed in either jaw for ejecting the veneer laminae from between the jaws back to the feed means after jointing.

7. The combination of claim 5, wherein gluing means are provided to be driven to and fro with the cutter means for effecting edge gluing of the veneer laminae immediately after the jointing thereof by the cutter means.

8. The combination of claim 5, wherein closure of the jaws upon the veneer laminae is effected through pairs of co-acting toggle links disposed astraddle the jaw ends and driven in synchronous rotation to maintain the laminae engaging faces of the jaws substantially parallel to each other at all times as said jaws traverse rectilinear paths of travel relative to said end support means.

9. A jogging and jointing machine comprising, in combination, clamping means including a pair of jaws adapted for movement between an open position and a closed position for clamping sheets of cuttable material face to face with the adjacent edge margins thereof held tightly together, means for effecting the opening and closing of said jaws, means for driving the clamping means in rotation, shaker means positioned below said jaws for aligning the edges of said material, jump bar means for moving said material transversely of said jaws and into position for jointing, cutter means for jointing the edges of said material, means for driving the cutter means past said jaws into cutting engagement with the edges of the cuttable material while said material is clamped in said jointing position between said jaws, and means for controlling operation of the enumerated elements.

10. The combination of claim 9, wherein the control means include means for limiting operation of the driving means for the clamping means to such times as the cutter means are positioned clear of the jaws, and further include means for limiting operation of the driving means for the cutter means to such times as the clamp jaws are positioned to orient said material for edge alignment and positioning by the shaker means and jump bar means or for jointing by the cutter means.

11. The combination of claim 9, wherein the control means include provisions for both manual and automatic operation of the machine with automatic operation being effected through means synchronized with the rotation of said clamping means, the manner of operation being manually selectable by the machine operator.

12. A jogging and jointing machine comprising, in combination, clamping means including a pair of jaws for firmly clamping sheets of material together for jointing, means for driving the clamping means in rotation when the jaws thereof are in clamping engagement with said material, shaker means for aligning the edges of said material when rotated to a vertical position by the clamping means and released thereby for engagement with said shaker means, jump bar means interposed between the jaws of the clamping means and the shaker means for positioning the material between said jaws for jointing after the edge alignment of said material by the shaker means, cutter means for jointing the edges of said material, means for driving the cutter means past said jaws into cutting engagement with the material clamped between said jaws, and means for automatically controlling operation of the enumerated elements.

13. The combination of claim 12, wherein a feed table is provided for delivering the material to the clamping means and ejection means for carried within the clamp jaws for ejecting the material to the feed table from the clamping means after the jointing of said material.

14. The combination of claim 12, wherein the control means include a control cylinder having a plurality of cams thereon for the sequential actuation of said enumerated elements.

15. The combination of claim 12, wherein the control means include means responsive to the position of said jaws for preventing operation of the cutter driving means when said jaws are obliquely positioned, and further include means responsive to the position occupied by the cutter means relative to said jaws for preventing rotation thereof when the cutter means are positioned intermediate the ends of the jaws.

16. The combination of claim 12, wherein the control means include means for manual control as well as automatic control and manually operable means are provided for selecting either mode of control, and wherein machine operation is entirely dependent upon operation of the cutter means, stoppage of said cutter means resulting in stoppage of operation of the entire machine.

17. In a machine for the jointing of veneer laminae in which such laminae are held stationary between the jaws of rotatable clamping means while cutter means are driven into cutting engagement with the laminae for effecting the edge jointing thereof, in combination therewith, shaker means disposed beneath the jaws of the clamping means adapted for up and down movement in effecting edge alignment of the veneer laminae, and jump bar means disposed beneath the jaw of the clamping means and movable independently and transversely thereof for positioning the veneer laminae, after edge alignment, relative to said jaws for subsequent jointing by the cutter means.

18. The combination of claim 17, wherein the shaker means effects edge alignment of the veneer laminae by imparting vibration thereto through a platen member aligned with the jaws of the clamping means and adapted to be driven in up-and-down movement to urge the bottom edges of the veneer laminae into contact with same, said platen member having a plurality of recesses in its upper face, and wherein positioning of the laminae by the jump bar means is effected through a plurality of members adapted for elevation from retracted positions within said recesses for engagement with the aligned bottom edges of the laminae.

19. In a machine for the jointing of veneer laminae, the combination comprising clamping means for clamping sheets of veneer laminae together face to face for jointing, said clamping means including a pair of substantially co-extensive parallel jaws having planar clamping faces and carried between rotatable end support members and through synchronously driven toggle link means actuated and interconnected for clamping coaction while being at all times maintained by said toggle links with their clamping faces substantially parallel, shaker means disposed beneath the jaws of the clamping means for effecting edge alignment of the veneer laminae and jump bar means for positioning the veneer laminae, after edge alignment, relative to the clamp jaws for subsequent jointing by the cutter means.

20. The combination of claim 19, wherein the shaker means accomplishes edge alignment of the veneer laminae by imparting vibration thereto through a platen member adapted to be driven in an up-and-down movement, said platen member having in its laminae engaging upper face a plurality of recesses, and wherein positioning of the laminae by the jump bar means is effected through a plurality of members movable transversely and independently of the clamping means and disposed for elevation from retracted positions in said recesses to engage the aligned edges of the laminae.

21. A method for jogging and jointing of veneer laminae comprising the steps of clamping superposed sheets of veneer laminae tightly together; rotating the clamped laminae into an edge down position; releasing the laminae from tight clamping restraint; moving the laminae up and down to effect alignment of the laminae lower edges; clamping the edge aligned laminae tightly together in face to face relationship to entirely flatten same; and while thus tightly clamped and flattened, rotating said laminae from said edge down position into a jointing position and jointing said aligned edges of the flattened laminae by driving cutter means into cutting engagement therewith.

22. A method for the jogging and jointing of sheet material comprising the steps of clamping sheets of said material tightly together in superposed relationship; rotating said material into an edge down position; releasing the material from tight clamping restraint; moving the material up and down to effect alignment of its lower edges; positioning the material for jointing by supporting same upon said aligned lower edges; clamping the positioned and aligned material tightly together in face to face relationship to substantially flatten same throughout; and while thus tightly clamped, rotating said material immediately into jointing position and jointing said aligned edges.

23. A method for the jogging and jointing of sheet material comprising the steps of clamping sheets of said material tightly together in superposed relationship; rotating said material into an edge down position; releasing the material from tight clamping restraint; moving the material up and down to effect alignment of its lower edges; clamping the edge aligned material tightly together in face to face relationship to flatten same throughout; while thus tightly clamped, rotating said material into said jointing position and jointing said aligned edges; while still thusly clamped, rotating the material into an edge down position with the jointed edges uppermost and thereafter jointing the opposite unjointed or lowermost of the material edges by repeating those of the above enumerated steps subsequent to the step of positioning the material edge down.

24. The method of claim 23, wherein immediately following jointing of each of the edges of the sheet material glue is applied thereto.

25. A jogging and jointing machine comprising, in combination, clamping means including a pair of jaws for firmly clamping sheets of material together for jointing, means for driving the clamping means in rotation when the jaws thereof are in clamping engagement with said material, shaker means for aligning the edges of said material when the latter is rotated into an edge down position by the clamping means and released thereby for engagement with said shaker means, jump bar means interposed between the jaws of the clamping means and the shaker means for moving the material after edge alignment transversely of said jaws and into a jointing position therebetween, cutter means for jointing the edges of said material, means for driving the cutter means past said jaws into cutting engagement with the material clamped between said jaws, and means for automatically controlling operation of the enumerated elements, said controlling means including a control cylinder having a plurality of cams thereon for the sequential actuation of said enumerated elements.

26. The combination of claim 25, wherein the controlling means include means responsive to the position of said jaws for preventing operation of the cutter driving means when said jaws are improperly positioned, and further include means responsive to the position occupied by the cutter means relative to said jaws for preventing rotation thereof when the cutter means are positioned intermediate the ends of the jaws.

*27. A machine for the jogging and jointing of veneer laminae comprising, in combination, clamping means for clamping veneer laminae together in face to face relationship for jointing, means for driving the clamping means in rotation, shaker means disposed beneath the clamping means for effecting edge alignment of the veneer laminae by imparting vibration thereto when said laminae are rotated into edge down position and released by the clamping means to gravitate downward into engagement with the shaker means, positioning means associated with said shaker means for thereafter positioning the edge aligned veneer laminae relative to the clamping means for reclamping thereby in fixed position preparatory to jointing, cutter means disposed for movement immediately adjacent a side of said clamping means for jointing the edge aligned and positioned veneer laminae after rotation thereof by the clamping means out of said edge down position and while said laminae are clamped together in said fixed position by the clamping means, and means for driving the cutter means into cutting engagement with the edges of the veneer laminae for effecting the fixedly positioned jointing thereof.*

*28. A jogging and jointing machine comprising, in*

*combination, clamping means including a pair of jaws adapted for movement between an open position and a closed posiiton for clamping sheets of cuttable material face to face with the adjacent edge margins thereof held tightly together, means for effecting the opening and closing of said jaws, means for driving the clamping means in rotation, shaker and positioning means mounted below said jaws for aligning the edges of said material and positioning said material transversely of said jaws and in position for jointing, cutter means disposed for movement immeditaely adjacent to a side of said clamping means for jointing the edges of said material, means for driving the cutter means past said jaws into cutting engagement with the edges of the cuttable material while said material is clamped in said jointing position between said jaws, and means for controlling operation of the enumerated elements.*

*29. A method for the jogging and jointing of veneer laminae comprising the steps of moving a stack of veneer laminae to a jogging position where the laminae of the stack are positioned edge down and free for movement with respect to each other; moving the laminae up and down to effect alignment of the laminae lower edges; clamping the edge aligned laminae tightly together in face to face relationship to entirely flatten same; and while thus tightly clamped and flattened, rotating said laminae from said edge down position into a jointing position and jointing said aligned edges of the flattened laminae by driving cutter means into cutting engagement therewith.*

*30. A machine for the jogging and jointing of veneer laminae comprising, in combination, clamping means for clamping veneer laminae together in face to face relationship for jointing, means for driving the clamping means in rotation, shaker and positioning means mounted below said jaws for aligning the edges of said material and positioning said material transversely of said jaws and in position for jointing, cutter means disposed for movement immediately adjacent a side of said clamping means for jointing the edge aligned and positioned veneer laminae after rotation thereof by the clamping means out of said edge down position and while said laminae are clamped together in said fixed position by the clamping means, and means for driving the cutter means into cutting engagement with the edges of the veneer laminae for effecting the fixedly positioned jointing thereof.*

References Cited in the file of this patent or the original patent

UNITED STATES PATENTS

| | | |
|---|---|---|
| 1,853,554 | Dennis | Apr. 12, 1932 |
| 2,242,179 | Gustin | May 13, 1941 |
| 2,712,840 | Gilbertson | July 12, 1955 |
| 2,830,529 | Deiters | Apr. 15, 1958 |
| 2,834,384 | Pearl | May 13, 1958 |
| 2,936,007 | Palm | May 10, 1960 |
| 2,998,039 | Bamford et al. | Aug. 29, 1961 |